United States Patent
Heinemann et al.

(10) Patent No.: US 11,429,451 B2
(45) Date of Patent: Aug. 30, 2022

(54) MANAGING EXCEPTIONS ON A SHARED RESOURCE

(71) Applicant: Microsoft Technology Licensing, LLC, Redmond, WA (US)

(72) Inventors: Chad R. Heinemann, Lake Stevens, WA (US); Alexander Robert Paul Grenier, Seattle, WA (US); Ziyad Ahmad Ibrahim, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 373 days.

(21) Appl. No.: 16/749,871

(22) Filed: Jan. 22, 2020

(65) Prior Publication Data
US 2021/0224116 A1 Jul. 22, 2021

(51) Int. Cl.
*G06F 9/50* (2006.01)
*G06F 1/24* (2006.01)
*G06F 9/38* (2018.01)
*G06F 9/54* (2006.01)

(52) U.S. Cl.
CPC ............... *G06F 9/505* (2013.01); *G06F 1/24* (2013.01); *G06F 9/3861* (2013.01); *G06F 9/3877* (2013.01); *G06F 9/5016* (2013.01); *G06F 9/542* (2013.01); *G06F 9/544* (2013.01)

(58) Field of Classification Search
CPC ...................................... G06F 9/505
See application file for complete search history.

(56) References Cited

U.S. PATENT DOCUMENTS

| 5,522,027 | A | 5/1996 | Matsumoto et al. |
| 6,543,002 | B1 * | 4/2003 | Kahle ................. G06F 11/0793 714/10 |
| 7,089,366 | B2 | 8/2006 | Horrigan et al. |
| 7,421,694 | B2 | 9/2008 | Gosalia et al. |

(Continued)

OTHER PUBLICATIONS

Elliott, et al., "Robust Real-Time Multiprocessor Interrupt Handling Motivated by GPUs", In Proceedings of the 24th Euromicro Conference on Real-Time Systems, Jul. 11, 2012, 83 Pages.

(Continued)

*Primary Examiner* — Charlie Sun
(74) *Attorney, Agent, or Firm* — Jacob P. Rohwer; Newport IP, LLC

(57) ABSTRACT

Examples are disclosed that relate to managing workloads provided by a plurality of clients to a shared resource. One example provides a computing device comprising a processor and a storage device storing instructions executable by the processor. The instructions are executable to provide a first workload from a first client and a second workload from a second client to a shared memory accessible by the first client, the second client, and a resource configured to process the first workload and the second workload. The computing device is configured to determine that an exception has occurred while processing the first workload, and to take an action to prevent execution of at least some additional work from the first client. The instructions are further executable to receive a result of processing the second workload after taking the action to prevent the execution of the additional work.

20 Claims, 6 Drawing Sheets

(56) References Cited

U.S. PATENT DOCUMENTS

| | | |
|---|---|---|
| 9,135,077 B2 | 9/2015 | Schmit et al. |
| 9,275,429 B2 | 3/2016 | Alla et al. |
| 9,563,557 B2 | 2/2017 | Kumar et al. |
| 2012/0075314 A1 | 3/2012 | Malakapalli et al. |
| 2020/0097646 A1* | 3/2020 | Buhren .................. G06F 21/53 |

OTHER PUBLICATIONS

Jablin, et al., "Dynamically Managed Data for CPU-GPU Architectures", In Proceedings of the Tenth International Symposium on Code Generation, Mar. 31, 2012, pp. 165-174.

"International Search Report & Written Opinion Issued in PCT Application No. PCT/US20/067093", dated Apr. 1, 2021, 13 Pages.

* cited by examiner

MANAGING EXCEPTIONS ON A SHARED RESOURCE

BACKGROUND

A computing resource may be shared among multiple independent clients. For example, a personal computer or game console may use a same coprocessor to process workloads for multiple client applications.

SUMMARY

Examples are disclosed that relate to managing workloads provided by a plurality of clients to a shared resource. One example provides a computing device comprising a processor and a storage device storing instructions executable by the processor. The instructions are executable by the processor to provide a first workload from a first client and a second workload from a second client to a shared memory accessible by the first client, the second client, and a resource configured to process the first workload and the second workload. The instructions are further executable to determine that an exception has occurred while processing the first workload, and to take an action to prevent execution of at least some additional work from the first client. The instructions are further executable to receive a result of processing of the second workload by the resource after taking the action to prevent the execution of at least some additional work from the first client.

Another example provides, enacted on a computing device comprising a resource, a method for managing workloads provided to the resource by a plurality of clients. The method comprises, at the resource, accessing a shared memory comprising a first workload provided to the shared memory by a first client and a second workload provided to the shared memory by a second client. The first workload is read from the shared memory and processed. Based upon an exception occurring while processing the first workload, the method includes receiving an instruction to reboot, and in response to the instruction, rebooting, and not performing at least some additional work from the first client. The method further comprises reading the second workload from the shared memory, processing the second workload, and outputting a result of processing the second workload to the shared memory.

Another example provides, enacted on a computing device comprising a processor and a coprocessor, a method for managing workloads provided by a plurality of clients executed by the processor to the coprocessor. The method comprises accessing a shared memory comprising a first workload provided to the shared memory by a first client and a second workload provided to the shared memory by a second client. The method further comprises reading the first workload from the shared memory, processing the first workload, and determining that an exception has occurred while processing the first workload. Based upon the exception occurring, the method comprises rebooting the coprocessor, and not performing at least some additional work from the first client. The method further comprises reading the second workload from the shared memory, processing the shared workload, and outputting a result of processing the second workload to the shared memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
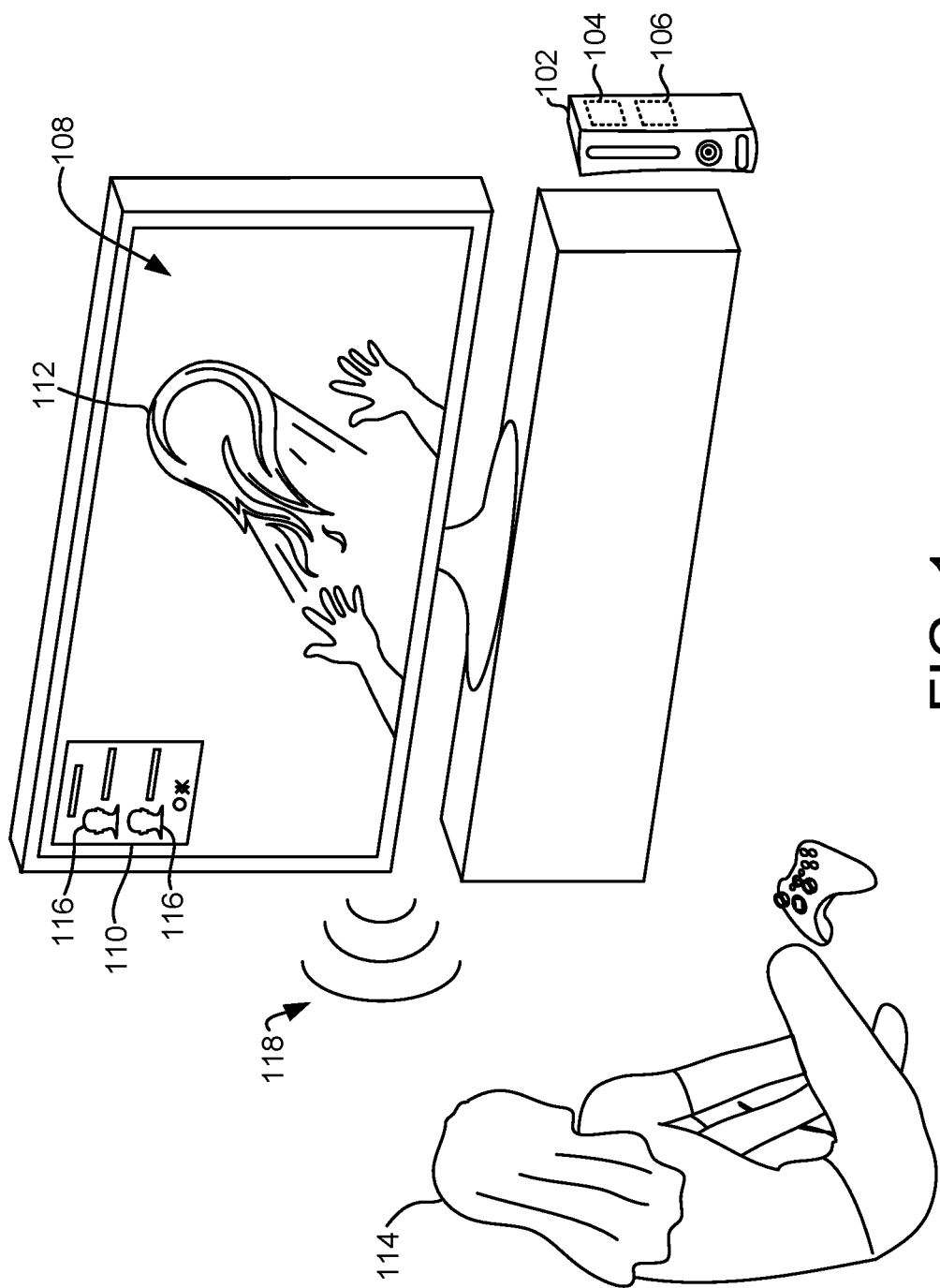
FIG. 1 shows an example computing environment including an example computing device in the form of a game console.

As mentioned above, some computing resources are shared among multiple clients. For example, a personal computer, game console, or other type of computing device may use a coprocessor to process workloads for multiple client applications. Likewise, a remote service may be utilized by a plurality of remote client applications. At times, an exception may occur while a shared resource is processing a workload. For example, malformed work items or hardware bugs may cause a workload to crash or hang. Such exceptions interrupt progress of the current workload, and may also prevent other clients from accessing the resource. Furthermore, recovering after the exception occurs may take a significant amount of time and thus be intrusive to the clients. For example, recovering from an exception may include purging client data and state data from a coprocessor, resetting caches, workload queues, hardware, software, firmware, and/or other suitable components, and reinitializing the clients.

As one example of a shared resource, a single-threaded audio coprocessor may be used to execute workloads for an audio recording client and a voice chat client, which are unaware of each other. Workloads for the client may be scheduled for the coprocessor in a round-robin fashion. Where an audio recording client workload is scheduled ahead of a voice chat client workload, if an exception occurs while processing the audio recording client workload (e.g. the audio recording client workload hangs in an infinite loop), the coprocessor may not become free to process the voice chat client workload without intervention. Recovering from this state may involve purging client data and state data from the coprocessor, rebooting the coprocessor, and reinitializing the clients. As a result, both the audio recording client and the voice chat client may be interrupted or shut down.

Accordingly, examples are disclosed that relate to managing workloads provided to a shared resource by a plurality of clients. Briefly, a first workload from a first client and a second workload from a second client are provided to a shared memory accessible by the first client, the second client, and a resource configured to process the first workload and the second workload. The resource reads the first workload from the shared memory and processes the first workload. When an exception occurs while processing the first workload, an action is taken to prevent execution of at least some additional work from the first client, such as removing the first client from an active process list. Further, the resource is rebooted. State data for the first workload and the second workload are stored in the shared memory, such that the clients are stateless on the resource. Due to the stateless nature of the clients, work for the remaining clients may continue as if the first workload finished processing in a normal manner after rebooting. The resource reads the second workload from the shared memory, processes the second workload, and outputs a result of processing the second workload to the shared memory. The computing device receives the result of processing the second workload after taking the action to prevent the execution of at least some additional work from the first client. This may mitigate the effects of a single problematic client and enable a more seamless recovery after the exception has occurred.

FIG. 1 shows an example computing environment including an example computing device in the form of a game console 102. The game console 102 comprises a processor 104, such as a CPU, configured to execute a plurality of client computer applications. For example, in FIG. 1, the processor 104 is configured to execute a game 108 and a chat application 110.

The game console 102 also comprises a computing resource in the form of a coprocessor 106 configured to perform work for client applications executed by the processor 104. The coprocessor 106 may be shared between two or more clients. In some examples, the coprocessor 106 comprises an audio coprocessor. The game 108 comprises a first client, which uses the audio coprocessor to encode audio 118. The chat application 110 comprises a second client, which uses the audio coprocessor to transmit, receive, and record voice conversations between a player 114 and one or more remote players 118. It will also be appreciated that the coprocessor 106 may comprise any other suitable type of coprocessor or other shared resource configured to execute instructions, including but not limited to a graphics processing unit (GPU).

Figure 2:
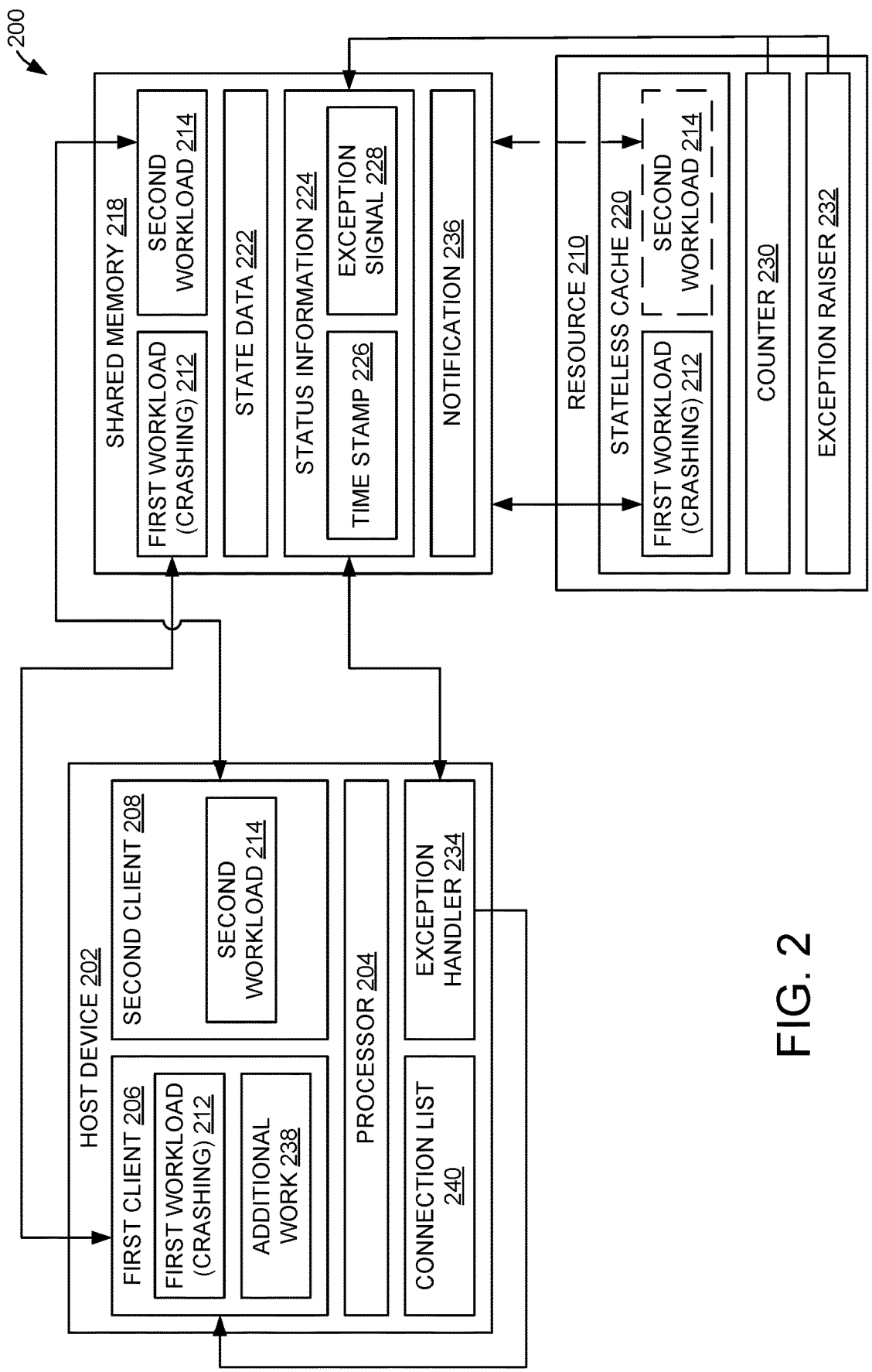
FIG. 2 is a block diagram of an example system for managing workloads provided to a resource by a plurality of clients.

FIG. 2 shows a block diagram of an example computing system 200. In some examples, the computing system 200 takes the form of a gaming device, such as the game console 102 of FIG. 1. In other examples, the computing system 200 comprises a personal computer, server computer, tablet computer, home-entertainment computer, mobile computing device (e.g., smartphone), and/or any other suitable computing device. Further, in some examples, the computing system 200 comprises two or more computing devices connected, for example, via a local and/or wide area network.

The computing system 200 comprises a host device 202, a resource 210 and a shared memory 218. In some examples, the host device 202, resource and shared memory may be located on a same computing device. In other examples, the host device 202 may be located remotely from the resource 210 and/or the shared memory 218. Where the host device 202 is located remotely from the shared memory 218, the host device 202 may access the shared memory 218 via a suitable connection, such as a network connection.

In this example, the host device 202 comprises a processor 204 configured to execute a first client 206 and a second client 208. In some examples, the first client 206 and the second client 208 comprise software applications configured to run on the host device 202, such as the game application 108 and the chat application 110 of FIG. 1. In other examples, the first client 206 and the second client 208 comprise discrete tasks of a single software application. For example, the chat application 110 of FIG. 1 has one or more tasks that allow the player 114 to communicate with the one or more remote players 116, and one or more tasks that allow the player 114 to record their communication with the one or more remote players 116. In yet other examples, a first client and a second client may be running on different computing devices that are both connected to shared memory via a network connection.

The resource 210 may take any form suitable to perform work for multiple clients. For example, as mentioned above the resource may take the form of a coprocessor, such as the coprocessor 106 of FIG. 1. In other examples, the resource 210 may comprise any other suitable type of computing resource, such as a CPU, a server, or a virtual machine.

Where the resource 210 and host device 202 are on a same computing device, the resource 210 and host device may be located on separate boards in the device (e.g. the resource may comprise a PCI-based graphics card or sound card), may be implemented as separate chips on a same board, or may be integrated in a system on a chip (SoC).

In the example of FIG. 2, the first client 206 generates a first workload 212 for the resource 210, and the second client 208 generates a second workload 214 for the resource 210. The first workload 212 and second workload 214 each may comprise any suitable data, metadata, and/or instructions for the resource 210. In some examples, the first and/or second workloads comprise audio data and instructions for the resource 210 to perform compression encoding, audio spatialization, digital signal processing (DSP), or other processing. In other examples, the first and second workloads comprise video data and/or instructions for the resource 210 to process the video data. In a more specific example, the first workload 212 is configured to encode audio for the game 108 of FIG. 1, and the second workload 214 is configured to transmit, receive, or record communications for the chat application 110 of FIG. 1.

In some examples, the host device 202 serves as a scheduler to assign the first workload 212 and the second workload 214 to the resource 210. The host device 202 may use any suitable method to assign time on the resource 210 to the first workload 212 and the second workload 214. For example, the processor 204 may assign the first workload 212 and the second workload 214 to a single-threaded coprocessor in round-robin fashion. In other examples, a singleton at the host device 202 manages all work from the first client 206 and the second client 208, including scheduling workloads for the resource 210 from both clients.

The host device 202 provides the first workload 212 and the second workload 214 to the resource 210 via a shared memory 218. The shared memory 218 is accessible by at least the first client 206, the second client 208, and the resource 210. The shared memory 218 may be located at any suitable location that is external to the resource 210. In some examples, the shared memory 218 is integrated with the host device 202. For example, the shared memory 218 may comprise a location on a main system memory (e.g. RAM or SRAM) of the host device 202. In other examples, the shared memory 218 may be provided by one or more device registers on the host device 202. In yet other examples, the host device 202, the shared memory 218, and the resource 210 comprise separate devices.

In some examples, the shared memory 218 comprises a command queue. The command queue enables scheduling and execution of the first workload 212 and the second workload 214 at the resource 210. The shared memory 218 may additionally or alternatively include a message/response queue. The message/response queue facilitates receipt of one or more results of processing the first workload 212 and the second workload 214 from the resource 210.

To begin work on the first workload 212, the resource 210 reads the first workload 212 from the shared memory 218, and stores the first workload 212 in a stateless cache 220 during execution. In the example of FIG. 2, the resource 210 does not read the second workload 214 at the same time as the first workload 212. Instead, as described in more detail below, the second workload 214 is queued in the shared memory 218.

In some examples, client memory is flushed from the cache 220 upon finishing a unit of work. For example, data from the first workload 212 may be purged from the cache 220 once first workload 212 is finished being handled by the resource 210, prior to reading the second workload 214 from the shared memory 218. The resource 210 is configured to store state data 222 for the first workload 212 and the second workload 214 in the shared memory 218. In this manner, all clients and workloads are stateless at the resource 210. In other examples, the state data 222 is stored at the resource 210. In such examples, state data for the first workload 212 may be purged before the resource 210 can begin handling the second workload 214.

In the example of FIG. 2, an exception occurs while the first workload 212 is being processed. For example, the first workload 212 may crash or hang. In other examples, the exception can occur at any other suitable location within the computing system 200, such as the host device 202 or the shared memory 218. An exception that occurs at a client may be just as disruptive as an exception that occurs at the resource 210. For example, the resource 210 may be unaware that the client is unresponsive. Thus, resources may continue to be unnecessarily allocated to the unresponsive client.

Exceptions may occur for many reasons, including one or more hardware bugs and/or one or more faults in the workload. For example, an audio DSP resource may crash if it is sent corrupted or bad metadata. As another example, an audio spatializer may crash if one or more parameters, such as position (e.g. in XYZ coordinates), shape (e.g. spherical or conical), or size, are provided incorrectly. In yet other examples, the exception may be caused when data is unaligned at the resource, if the workload invokes a command that is incompatible with the resource, or if memory is not formed correctly for alignment.

The host device 202 is configured to detect the exception. In some examples, the host device 202 may be configured to determine that the exception has occurred by reading status information 224 from the shared memory 218. The status information 224 is provided to the shared memory 218 by the resource 210.

The status information 224 may comprise any suitable information that may be used to indicate the status of a workload. In some examples, the status information 224 comprises a time stamp 226. The time stamp 226 may be iteratively output by the resource 210 and written to the shared memory 218 or a suitable global register. In the example of FIG. 2, the resource 210 comprises a counter 230 configured to output the time stamp 226 to the shared memory 218. In some examples, the counter 230 is external to a workload processing portion of the resource 210.

The counter 230 may be configured to output the time stamp 226 at regular intervals (e.g. every 50 milliseconds). In other examples, the counter 230 may be configured to output the time stamp 226 based on progress made by the resource 210 handling a workload. For example, a coprocessor may execute a loop to perform a client's work (e.g. a workload or a subset of a workload) and then update a global register with the time stamp. Under normal conditions, the host device 202 may expect the time stamp 226 to regularly progress. Where a hang or freeze occurs, the resource 210 may cease updating the time stamp 226.

Accordingly, the host device 202 may determine that a hang condition or a freeze has occurred by monitoring the time stamp 226. In some examples, the computing device is configured to read the time stamp 226, then wait for a measured time and read the time stamp 226 again. If the time stamp 226 has not changed after a threshold time has elapsed, the host device 202 determines that an exception has occurred.

The threshold time may change based on different use cases and how long a workload is expected to use the resource 210. In some examples, a workload may be expected to finish processing within 100 ms. Accordingly, if the time stamp 226 has not been updated within 100 ms, the host device 202 may determine that a hang condition has occurred. Other workloads may take a different amount of time to complete, and the threshold time may be adjusted accordingly.

The host device 202 also is configured to determine that an exception has occurred by receiving an exception signal 228. In some examples, the exception signal 228 is provided to the shared memory 218 by the resource 210. For example, the exception signal 228 may comprise an exception flag. The exception flag may be a bit in the shared memory 218 that the resource 210 may set to indicate that the first workload 212 has crashed. In other examples, the exception signal 228 may take any other suitable form.

In some examples, the exception signal 228 is output by an exception raiser 232 on the resource 210. The exception raiser 232 may be native to the resource 210. For example, the exception raiser may comprise firmware on a coprocessor. It will also be appreciated that, in some examples, the exception raiser 232 may provide the resource 210 with native abilities to raise and handle exceptions. For example, in response to determining that an exception occurs, the exception raiser 232 may output the exception signal 228 via a pin that also triggers the resource 210 to reset itself.

In some examples, the resource 210 is configured to interrupt the host device 202. The resource 210 may do so in any suitable manner. For example, the resource 210 may use a standard PCI Express interrupt path. In some examples, the host device 202 is configured to receive the interrupt via an exception handler 234. In some examples, the exception handler 234 may comprise software within a kernel of an operating system on the host device 202. Based on receiving the interrupt, or another suitable notification of the exception, the exception handler 234 may execute one or more instructions to resolve the exception.

In the case of a hang condition, the host device 202 may be configured to monitor memory traffic at the resource 210. For example, the host device 202 may monitor ingoing/outgoing memory requests. When the resource memory traffic stops, the host device 202 is configured to remove the client. For example, based on detecting an error, the host device 202 may use a driver for the resource 210 to stall the resource 210 and remove the first workload 212. The host device 202 is then configured to reset the resource 210.

In some examples, the host device 202 is configured to output, to the first client 206, a notification 236 of the exception. The notification 236 may include an error code or an explanation of the exception, data indicating where in a set of instructions the exception occurred, and/or other any other suitable data related to the exception (e.g. an identity of the client for which the exception occurred). In some examples, the notification 236 is provided to the shared memory 218 by the resource 210. For example, the notification 236 may be generated or triggered by the exception raiser 232. In other examples, the notification 236 is stored in a device register on the resource 210 for the first client 206 to retrieve. In yet other examples, the notification 236 is stored in a memory of the host device 202. By receiving the notification 236, the first client 206 may be informed of the exception and react accordingly.

In some examples, the host device 202 is configured to react to an exception by rebooting the resource 210. In other examples, the host device 202 is configured to take an action to prevent execution of at least some additional work 238 from the first client 206. Further, in some examples, the host device 202 is configured to terminate a connection between the first client 206 and the resource 210. For example, the host device 202 may remove the first client 206 from a connection list 240. The connection list 240 lists each client currently executing work on the resource 210. After being removed from the connection list 240, the first client 206 can continue making requests for the resource 210 to execute work. However, the resource 210 will not handle those requests unless the first client 206 reestablishes connection. The resource 210 continues to communicate with other clients (e.g. the second client 208) via the shared memory 218. Accordingly, if the first client 206 reestablishes connection with the resource 210, the additional work 238 may be scheduled after the second workload 214 from the second client 208.

For example, an audio recorder client may be executing a recording process on a coprocessor. If the recording process crashes, an exception may be triggered, and the process ended. In some examples, the client continues producing an audio recording even though the process is no longer running. In this case, the recording may be silent from a time that the recording process crashed due to the recording workload not being processed during that time by the resource. In other examples, the client knows that it has been disconnected (e.g. by receiving a notification). In this case, the client may reset itself. From a user's perspective, the audio may disappear from the recording between the time the recording process crashed and a time the recording process restarted. In yet other examples, the client may shut down and/or notify the user that the recording has stopped.

As another example, the first client 206 may become unresponsive while the first workload 212 is being processed by the resource 210. Based on determining that the first client 206 is unresponsive, the host device 202 may release the resource 210 to another client.

In some examples, the resource 210 is configured to flush client data before resetting. For example, the exception raiser 232 may be configured to flush the stateless cache 220 to the shared memory 218 after interrupting the host device 202. In this manner, the resource 210 may allow the host device 202 to interrogate up-to-date data from the resource 210 after the exception occurred. The resource 210 may then enter a standby state, waiting for the host device 202 to take it through a recovery sequence.

For example, the host device 202 may be configured to initiate a reboot process at the resource 210. In some examples, the host device 202 sends a signal to a reset pin of the resource 210, which causes the resource 210 to reboot. In other examples, the resource 210 may send itself the signal (e.g. by outputting a signal to its own reset pin). For example, the exception raiser 232 may be configured to detect the exception and output the reset signal to the reset pin.

Due to the stateless nature of the clients, after the resource 210 is reset, work for the remaining clients may continue as if the first workload finished processing in a normal manner. Accordingly, the resource 210 is configured to begin work on the second workload 214 by reading the workload 214 from the shared memory. The second workload 214 is processed in the same manner as the first workload 212. A result of processing the second workload 214 is output to the shared memory 218 and read from the shared memory 218 by the host device 202.

Figure 3A:
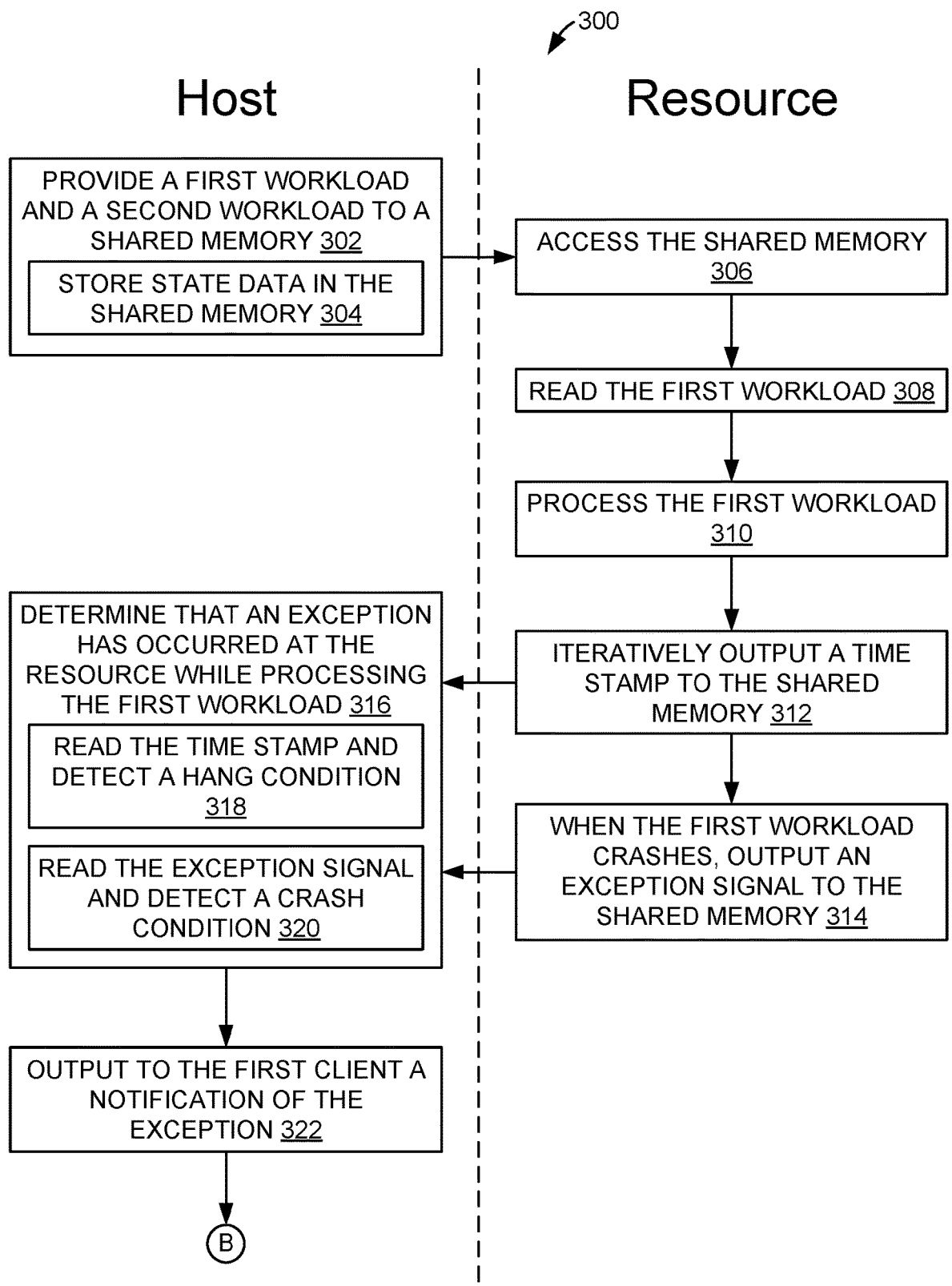
FIGS. 3A, 3B, and 3C illustrate a flow diagram depicting an example method for managing workloads provided to a resource by a plurality of clients.
Figure 3B:
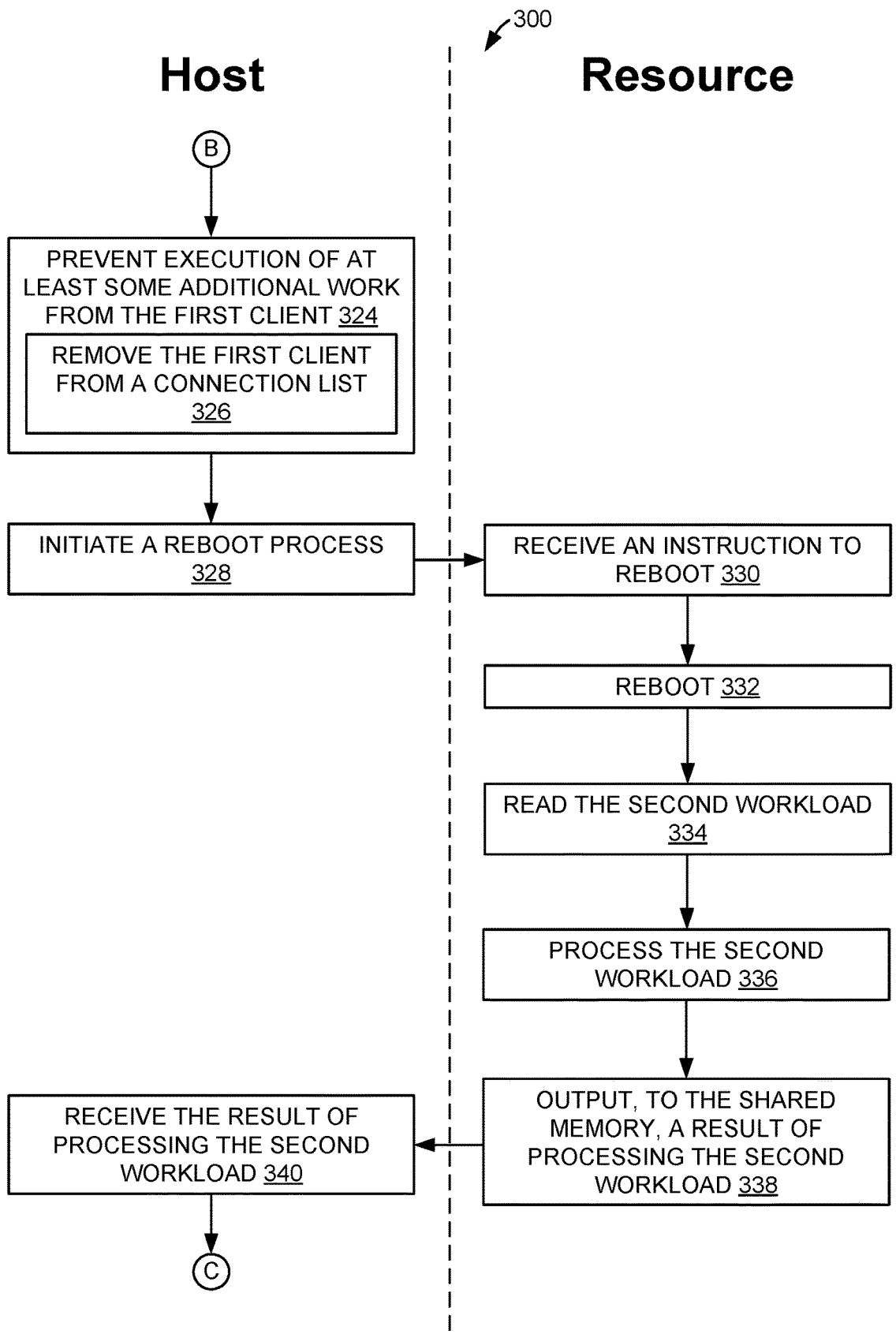

FIGS. 3A-3B show a flow diagram depicting an example method 300 for managing workloads provided by a plurality of clients to a shared resource. The following description of example method 300 is provided with reference to components described above and shown in FIGS. 1-2, but it will be appreciated that method 300 also may be performed in other contexts using other suitable components.

First referring to FIG. 3A, at 302, the method 300 includes providing a first workload from a first client and a second workload from a second client to a shared memory. As indicated in FIG. 3, the first workload and the second workload may be provided to the shared memory by a host executing the first client and the second client, such as the host device 202 of FIG. 1. For example, the shared memory 218 of FIG. 2 is accessible by the host device 202, the first client 206, the second client 208, and the resource 210. As indicted at 304, state data is stored in the shared memory, rather than on the computing resource. In this manner, the clients are stateless on the resource.

Next, at 306, the method 300 includes accessing the shared memory via the resource, and at 308, reading the first workload from the shared memory. At 310, the method 300 includes processing the first workload.

As mentioned above, various exceptions may occur during execution of the first workload. Thus, method 300 provides for the detection by the host of any exceptions that occur during workload execution. For example, at 312, the method 300 includes iteratively outputting a time stamp to the shared memory while the first workload is processing. As described above, the time stamp may be output by a counter on the resource, and allows the detection of a hang condition on the resource. The time stamp may be output at regular intervals, based on progress made by the resource handling the workload, or on any other suitable time basis.

As another example, method 300 may additionally or alternatively include, at 314, outputting an exception signal to the shared memory when the first workload crashes. In some examples, as described above, the exception signal comprises an exception flag that the resource may raise to indicate that the first workload has crashed.

By outputting the exception signal and/or the time stamp to the shared memory, the resource enables the host to determine, at 316, that an exception has occurred at the resource while processing the first workload. For example, at 318, the method 300 may include reading the time stamp. Based on reading the time stamp, the host may detect a hang condition. At 320, the method 300 may include reading the exception signal. Based on reading the exception signal, the host may detect a crash condition.

In some examples, at 322, the method 300 includes outputting, to the first client, a notification of the exception. As described above, the notification may include data providing an error code or other data regarding a cause of the exception, and/or where in a set of instructions the exception occurred. In this manner, the first client 206 may be informed of the exception and react accordingly.

With reference now to FIG. 3B, at 324, the method 300 includes preventing execution of at least some additional work from the first client. In some examples, as indicated at 326, the host is configured to remove the first client from a connection list. In this manner, the resource will not receive additional workloads submitted by the first client until the first client reestablishes a connection.

Further, at 328, the host initiates a reboot process. At 330, the method 300 includes receiving, at the resource, an instruction to reboot. In some examples, the resource is configured to flush client data to the shared memory before rebooting. In this manner, the host may interrogate up-to-date data from the resource 210 after the exception occurred. At 332, the method 300 includes rebooting the resource.

After rebooting the resource may resume work. Thus, after rebooting, as indicated at 334, the method 300 includes reading the second workload. Due to the stateless nature of the clients, the resource may pick up work for the second client as if the first workload had finished processing in a normal manner. At 336, the method 300 includes processing the second workload.

Next, at 338, the resource outputs, to the shared memory, a result of processing the second workload. As indicated at 340, the host receives the result of processing the second workload. The host may receive the result by reading the shared memory.

Figure 3C:
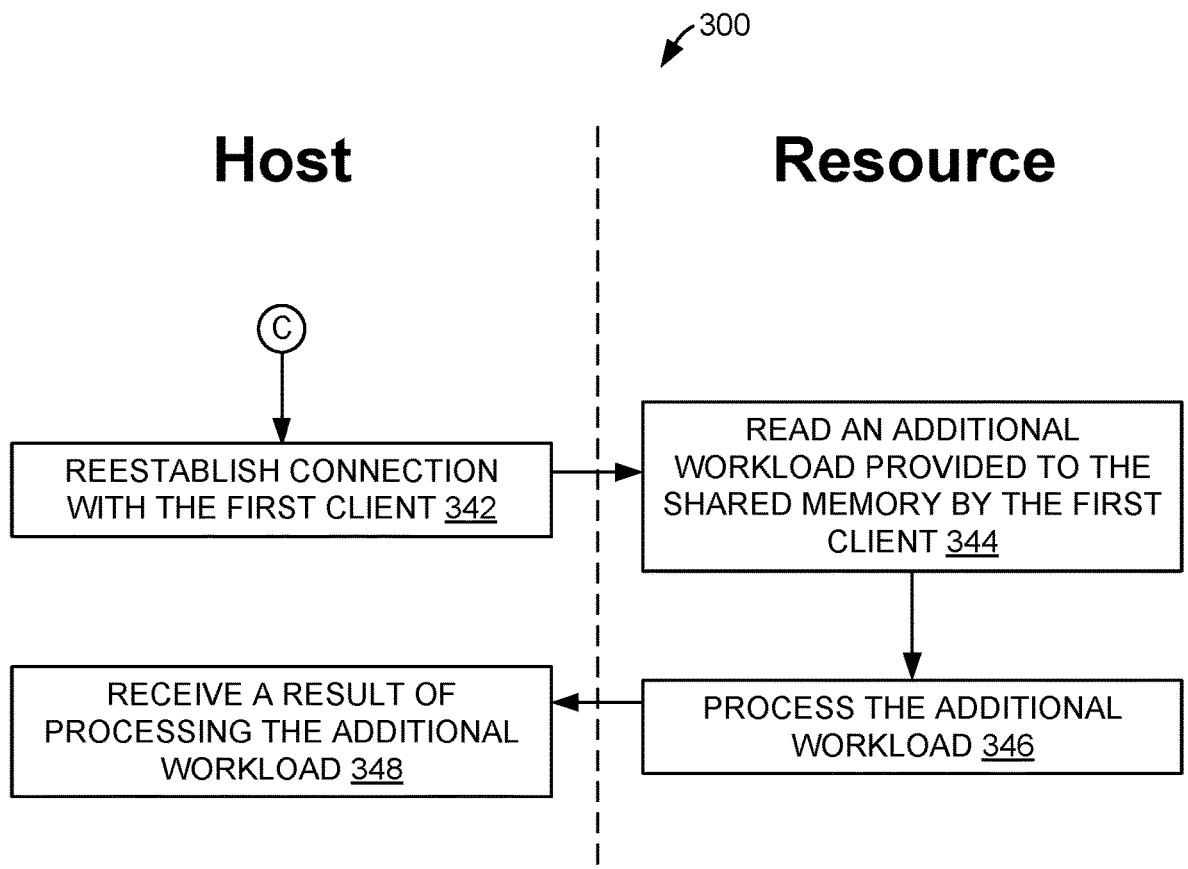

With reference now to FIG. 3C, in some examples, the method 300 includes, at 342, reestablishing connection with the first client. As indicated at FIG. 3, the connection may be established on the host side (e.g. on a host-side connection list). In this manner, the resource may handle at least some additional work for the first client. The additional work is handled by the host and resource in the same manner as the first workload and the second workload.

Accordingly, at 344, the method 300 includes reading an additional workload provided to the shared memory by the first client. At 346, the method 300 includes processing the additional workload. On the host side, at 348, the method 300 includes receiving a result of processing the additional workload.

In some embodiments, the methods and processes described herein may be tied to a computing system of one or more computing devices. In particular, such methods and processes may be implemented as a computer-application program or service, an application-programming interface (API), a library, and/or other computer-program product.

Figure 4:
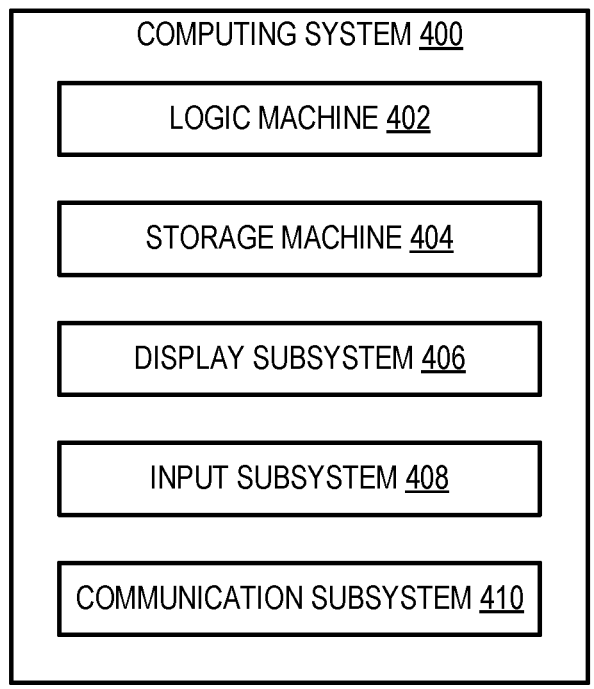
FIG. 4 shows a block diagram of an example computing system.

FIG. 4 schematically shows a non-limiting embodiment of a computing system 400 that can enact one or more of the methods and processes described above. Computing system 400 is shown in simplified form. Computing system 400 may take the form of one or more personal computers, server computers, tablet computers, home-entertainment computers, network computing devices, gaming devices, mobile computing devices, mobile communication devices (e.g., smart phone), and/or other computing devices. For example, the game console 102 of FIG. 1 and the computing system 200 of FIG. 2 may comprise aspects of the computing system 400.

Computing system 400 includes a logic machine 402 and a storage machine 404. Computing system 400 may optionally include a display subsystem 406, input subsystem 408, communication subsystem 410, and/or other components not shown in FIG. 4.

Logic machine 402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 404 includes one or more physical devices configured to hold instructions executable by the logic machine to implement the methods and processes described herein. When such methods and processes are implemented, the state of storage machine 404 may be transformed—e.g., to hold different data.

Storage machine 404 may include removable and/or built-in devices. Storage machine 404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 404 may include volatile, nonvolatile, dynamic, static, read/write, read-only, random-access, sequential-access, location-addressable, file-addressable, and/or content-addressable devices.

It will be appreciated that storage machine 404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 402 and storage machine 404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 400 implemented to perform a particular function. In some cases, a program may be instantiated via logic machine 402 executing instructions held by storage machine 404. It will be understood that different programs may be instantiated from the same application, service, etc. Likewise, the same program may be instantiated by different applications, services, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server computing devices.

When included, display subsystem 406 may be used to present a visual representation of data held by storage machine 404. This visual representation may take the form of a graphical user interface (GUI). As the herein described methods and processes change the data held by the storage machine, and thus transform the state of the storage machine, the state of display subsystem 406 may likewise be transformed to visually represent changes in the underlying data. Display subsystem 406 may include one or more display devices utilizing virtually any type of technology. Such display devices may be combined with logic machine 402 and/or storage machine 404 in a shared enclosure, or such display devices may be peripheral display devices.

When included, input subsystem 408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 410 may be configured to communicatively couple computing system 400 with one or more other computing devices. Communication subsystem 410 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow Computing system 400 to send and/or receive messages to and/or from other devices via a network such as the Internet.

Another example provides a computing device, comprising a processor, and a storage device storing instructions executable by the processor to provide a first workload from a first client and a second workload from a second client to a shared memory accessible by the first client, the second client, and a resource configured to process the first workload and the second workload, determine that an exception has occurred while processing the first workload, take an action to prevent execution of at least some additional work from the first client, and receive a result of processing of the second workload by the resource after taking the action to prevent the execution of at least some additional work from the first client. The resource may additionally or alternatively include a coprocessor. The resource may additionally or alternatively include a physical server or a virtual server. The resource may additionally or alternatively be located on the computing device. The resource may additionally or alternatively be external to the computing device. The instructions may additionally or alternatively be executable to initiate a reboot process. The instructions may additionally or alternatively be executable to determine that the exception has occurred by reading the shared memory. The instructions may additionally or alternatively be executable to store state data for the first workload and the second workload in the shared memory. The instructions may additionally or alternatively be executable to output to the first client a notification of the exception. The instructions executable to determine that the exception has occurred may additionally or alternatively be executable to receive a time stamp provided to the shared memory by the resource. The instructions executable to determine that the exception has occurred may additionally or alternatively be executable to receive an exception signal provided to the shared memory by the resource. The instructions executable to take the action to prevent the execution of at least some additional work from the first client may additionally or alternatively be executable to remove the first client from a connection list. The instructions may additionally or alternatively be executable to reestablish connection between the first client and the resource, and receive, from the resource, a result of processing at least some additional work from the first client after reestablishing the connection.

Another example provides, enacted on a computing device comprising a resource, a method for managing workloads provided by a plurality of clients, the method comprising, at the resource, accessing a shared memory comprising a first workload provided to the shared memory by a first client and a second workload provided to the shared memory by a second client, reading, from the shared memory, the first workload, processing the first workload, based upon an exception occurring while processing the first workload, receiving an instruction to reboot, and in response to the instruction, rebooting, and not performing at least some additional work from the first client, reading, from the shared memory, the second workload, processing the second workload, and outputting, to the shared memory, a result of processing the second workload. The method may additionally or alternatively include, wherein the exception comprises a hang condition, and the method further comprises, prior to receiving the instruction to reboot the resource, at the resource, iteratively outputting a time stamp to the shared memory. The method may additionally or alternatively include, wherein the exception comprises a crash condition, and the method further comprises, at the resource, prior to receiving the instruction to reboot the resource, outputting an exception signal to the shared memory. The method may additionally or alternatively include, terminating a connection with the first client based upon the exception occurring, and at the resource, reading, from the shared memory, at least some additional work provided to the shared memory by the first client via a new connection, processing the additional work from the first client, and outputting a result of processing the additional work to the shared memory.

Another example provides, enacted on a computing device comprising a processor and a coprocessor, a method for managing workloads provided by a plurality of clients executed by the processor to the coprocessor, the method comprising, accessing a shared memory comprising a first workload provided to the shared memory by a first client and a second workload provided to the shared memory by a second client, reading, from the shared memory, the first workload, processing the first workload, determining that an exception has occurred while processing the first workload, based upon the exception occurring, rebooting the coprocessor, and not performing at least some additional work from the first client, reading, from the shared memory, the second workload, processing the second workload, and outputting, to the shared memory, a result of processing the second workload. The method may additionally or alternatively include iteratively outputting, from the coprocessor, a time stamp to the shared memory. The method may additionally or alternatively include outputting, from the coprocessor, an exception signal to the shared memory.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
    a processor; and
    a storage device storing instructions executable by the processor to
        provide a first workload from a first client and a second workload from a second client to a shared memory accessible by the first client, the second client, and a resource configured to process the first workload and the second workload;
        determine that an exception has occurred while processing the first workload;
        take an action to prevent execution of at least some additional work from the first client; and
        receive a result of processing of the second workload by the resource after taking the action to prevent the execution of the at least some additional work from the first client.

2. The computing device of claim 1, wherein the resource comprises a coprocessor.

3. The computing device of claim 1, wherein the resource comprises a physical server or a virtual server.

4. The computing device of claim 1, wherein the resource is located on the computing device.

5. The computing device of claim 1, wherein the resource is external to the computing device.

6. The computing device of claim 1, wherein the instructions are further executable to initiate a reboot process.

7. The computing device of claim 1, wherein the instructions are further executable to determine that the exception has occurred by reading the shared memory.

8. The computing device of claim 1, wherein the instructions are further executable to store state data for the first workload and the second workload in the shared memory.

9. The computing device of claim 1, wherein the instructions are further executable to output to the first client a notification of the exception.

10. The computing device of claim 1, wherein the instructions executable to determine that the exception has occurred are further executable to receive a time stamp provided to the shared memory by the resource.

11. The computing device of claim 1, wherein the instructions executable to determine that the exception has occurred are further executable to receive an exception signal provided to the shared memory by the resource.

12. The computing device of claim 1, wherein the instructions executable to take the action to prevent the execution of the at least some additional work from the first client are further executable to remove the first client from a connection list.

13. The computing device of claim 12, wherein the instructions are further executable to reestablish a connection between the first client and the resource, and receive, from the resource, a result of processing the at least some additional work from the first client after reestablishing the connection.

14. Enacted on a computing device comprising a resource, a method for managing workloads provided by a plurality of clients, the method comprising:
    at the resource,
        accessing a shared memory comprising a first workload provided to the shared memory by a first client and a second workload provided to the shared memory by a second client;
        reading, from the shared memory, the first workload;
        processing the first workload;
        based upon an exception occurring while processing the first workload,
            receiving an instruction to reboot, and in response to the instruction, rebooting, and
            not performing at least some additional work from the first client;
        reading, from the shared memory, the second workload;
        processing the second workload; and
        outputting, to the shared memory, a result of processing the second workload.

15. The method of claim 14, wherein the exception comprises a hang condition, and the method further comprises, prior to receiving the instruction to reboot, at the resource, iteratively outputting a time stamp to the shared memory.

16. The method of claim 14, wherein the exception comprises a crash condition, and the method further comprises, at the resource, prior to receiving the instruction to reboot, outputting an exception signal to the shared memory.

17. The method of claim 14, further comprising:
    terminating a connection with the first client based upon the exception occurring; and
    at the resource,
        reading, from the shared memory, the at least some additional work provided to the shared memory by the first client via a new connection,
        processing the at least some additional work from the first client, and
        outputting a result of processing the at least some additional work to the shared memory.

18. Enacted on a computing device comprising a processor and a coprocessor, a method for managing workloads provided by a plurality of clients executed by the processor to the coprocessor, the method comprising:
    accessing a shared memory comprising a first workload provided to the shared memory by a first client and a second workload provided to the shared memory by a second client;
    reading, from the shared memory, the first workload;
    processing the first workload;
    determining that an exception has occurred while processing the first workload;
    based upon the exception occurring,
        rebooting the coprocessor, and
        not performing at least some additional work from the first client;
    reading, from the shared memory, the second workload;
    processing the second workload; and
    outputting, to the shared memory, a result of processing the second workload.

19. The method of claim 18, further comprising iteratively outputting, from the coprocessor, a time stamp to the shared memory.

20. The method of claim 18, further comprising outputting, from the coprocessor, an exception signal to the shared memory.

\* \* \* \* \*